United States Patent [19]

Uchino et al.

[11] Patent Number: 5,338,353
[45] Date of Patent: Aug. 16, 1994

[54] METHOD FOR PRODUCTION OF POWDER OF FINE INORGANIC PARTICLES

[75] Inventors: Hiroyoshi Uchino, Takatsuki; Tadahiro Yoneda, Ibaraki, both of Japan

[73] Assignee: Nippon Shokubai Kagaku Kogyo, Osaka, Japan

[21] Appl. No.: 963,521

[22] Filed: Oct. 20, 1992

Related U.S. Application Data

[63] Continuation of Ser. No. 824,889, Jan. 22, 1992, abandoned, which is a continuation of Ser. No. 506,151, Apr. 9, 1990, abandoned.

[30] Foreign Application Priority Data

Apr. 7, 1989 [JP] Japan .................. 1-87067
May 25, 1989 [JP] Japan .................. 1-130204
Mar. 5, 1990 [JP] Japan .................. 2-51668

[51] Int. Cl.$^5$ .............................. C09C 1/04
[52] U.S. Cl. ..................... 106/426; 106/416; 106/428; 106/429; 106/447; 106/487; 106/490
[58] Field of Search .............. 106/416, 426, 428, 429, 106/447, 487, 490, 400, 401

[56] References Cited

U.S. PATENT DOCUMENTS

| | | | |
|---|---|---|---|
| 4,566,908 | 1/1986 | Nakatani et al. | 106/490 |
| 4,615,912 | 10/1986 | Inoue et al. | 106/447 |
| 4,649,037 | 3/1987 | Marsh et al. | 423/338 |
| 4,713,233 | 12/1987 | Marsh et al. | 423/608 |
| 4,810,578 | 3/1989 | Prescott et al. | 106/487 |
| 4,839,944 | 5/1989 | Socci et al. | 106/447 |
| 4,845,056 | 7/1989 | Yamanis | 501/12 |
| 4,894,092 | 1/1990 | Nishihara et al. | 106/447 |
| 4,923,520 | 5/1990 | Anzai et al. | 106/490 |

FOREIGN PATENT DOCUMENTS

| | | |
|---|---|---|
| 0199930 | 11/1986 | European Pat. Off. |
| 52-38272 | 9/1977 | Japan . |
| 55-38588 | 10/1980 | Japan . |
| 58-35736 | 8/1983 | Japan . |
| 62-138310 | 6/1987 | Japan . |
| 63-185439 | 8/1988 | Japan . |
| 1-44098 | 9/1989 | Japan . |
| 1-46161 | 10/1989 | Japan . |
| 2166126 | 4/1986 | United Kingdom . |
| 2168334 | 6/1986 | United Kingdom . |
| 89/03365 | 4/1989 | World Int. Prop. O. . |

Primary Examiner—Mark L. Bell
Assistant Examiner—Scott L. Hertzog
Attorney, Agent, or Firm—Burns, Doane, Swecker & Mathis

[57] ABSTRACT

A method for the production of powder of fine inorganic particles excellent in dispersibility in various solvents from a slurry of said fine inorganic particles containing water, which method comprises preparing a slurry as a raw material by incorporating in said slurry at least one orgaic compound selected from the group consisting of (A) methanol and (B) organic compound capable of dissolving of dissolving water in an amount of not less than 1.0% by weight at 20° C. and forming a two-component azeotropic mixture of water and organic compounds having a water content of not less than 4.0% by weight and converting said prepared slurry into powder by the use of a powderization apparatus comprising an externally heatable pipe one end of which serves as a slurry inlet and the other end of which serves as a device for separating the produced powder and a vapor held in a vacuum state and a powder and a powder collecting chamber connected to said separating device.

22 Claims, No Drawings

METHOD FOR PRODUCTION OF POWDER OF FINE INORGANIC PARTICLES

This application is a continuation of application Ser. No. 07/824,889, filed Jan. 22, 1992, abandoned, which is a continuation of Ser. No. 07/506,151 filed Apr. 9, 1990, also abandoned.

BACKGROUND OF THE INVENTION

1. Field of the Invention

This invention relates to a method for the production of a powder of fine inorganic particles excelling in dispersibility in various solvents. More particularly, it relates to a method for the production of a powder of fine inorganic particles containing very few cohering particles and attaining very easy dispersion in various solvents from a slurry of fine inorganic particles in a water-containing solvent by using a specific apparatus.

2. Description of the Prior Art

Heretofore, as means of producing a powder of fine inorganic particles, the method of mechanical pulverization which comprises subjecting lumps of powder to the action of a pulverization device in a solvent or in a non-solvent, the method of dry synthesis which produces fine particles by subjecting a gasifiable metal compound to reaction and decomposition in the gaseous phase or subjecting a metal plate as to spattering, and the method for producing a slurry of fine particles by the so-called wet synthesis as by hydrolyzing a hydrolyzable metal compound in a solution or subjecting a metal compound to the action of a precipitant or ion exchanger in a solution and thereafter separating the fine particles from the slurry and drying the separated fine particles have been known to the art.

The method of mechanical pulverization has a problem of requiring large energy for the pulverization, allowing only limited control of particle diameter, and suffering the produced particles to acquire no definite shape and a wide diameter distribution and exhibit susceptibility of agglomeration. The agglomeration of particles is particularly conspicuous when the production uses no solvent.

Though the method of dry synthesis is capable of producing very fine primary particles, the produced powder comprises secondary particles resulting from agglomeration of primary particles. Thus, this method has a problem of failing to produce fine discrete particles and suffering the produced particles to acquire a very high bulk specific gravity.

The method of wet synthesis has an advantage that the fine particles in the slurry are readily dispersible in a discrete form. Because this method requires complicated steps of separating particles from the slurry and drying the separated particles and further because the slurry contains water, this method has problems of suffering the produced particles to agglomerate readily during the component steps of process and necessitating great labor and a large expense for the production of a powder excellent in dispersibility.

As means of precluding the problem of agglomeration of produced particles mentioned above, the method which comprises adding an organic solvent to the slurry of fine particles, heating the slurry to a temperature exceeding the distillation temperature of water thereby dehydrating the slurry, separating the particles from the slurry or organic solvent, and drying the separated particles has been proposed. Though this method is effective in preventing the agglomeration of produced particles, it has a problem of requiring use of a large amount of organic solvent and moreover entailing extra steps of separating particles from the slurry and drying the separated particles. It also have possibility that the fine particles are still susceptible, if not always, to agglomeration during the component steps of process.

Japanese Patent Laid-Open SHO 62(1987)-138,310 discloses a method for producing a powder of particles free from agglomeration by preparing a slurry of fine metallic oxide particles from a metal alkoxide as a raw material and treating this slurry supercrytically with carbon dioxide gas. This method, however, has the disadvantage that the operation is difficult and the cost of apparatus is high.

As means of economically advantageously producing a powder of fine particles from a slurry of fine particles of varying pigment, a method has been proposed which makes use of a powderization apparatus similar to that which is used in the present invention (Japanese Patent Publication SHO 52(1977)-38,272). This method, however, has a disadvantage that when the slurry contains water, the produced powder contains numerous cohering particles.

For the solution of this problem, there has been proposed a method which causes an organic solvent which is insoluble in water and volatile to coexist in a slurry of fine particles of pigment when the slurry contains water (Japanese Patent Publication SHO 55(1980)-38,588). The our follow-up experiment conducted on this improved method has revealed that when the fine particles of pigment happen to be of an inorganic substance, the coexistence of the water-insoluble organic solvent in the slurry is very meagerly effective in preventing the agglomeration of particles. The effect aimed at is totally inconspicuous particularly when the fine particles happen to be those of metallic oxide possessing a very active surface as obtained by the method of wet synthesis, for example.

As means of treating the fine inorganic particles for imparting an organic quality to their surface, the method which produces a powder by adding such a surface-treating agent as an organic macromolecular compound, an alcohol, or a coupling agent, for example, to the slurry of fine inorganic particles obtained by a varying process, heating the slurry thereby effecting necessary surface treatment, and thereafter inducing expulsion of the solvent by evaporation has been known to the art.

Generally, the fine inorganic particles which have been given no surface treatment possess a highly hydrophilic surface and have a large amount of water adsorbed to the surface. Because of the surface quality mentioned above, the slurry necessitates use of water or a highly hydrophilic solvent as the dispersion medium. The slurry, therefore, is destined to allow the presence of a large amount of water in addition to the water adsorbed to the fine particles.

The adsorbed water and the coexisting water have been the cause for degrading the effect of the surface treatment performed on the fine particles by the surface-treating agent capable of reacting with and joining to the surfaces of the fine particles. It has been customary, therefore, to employ such methods of poor efficiency such as the method which relies on the use of a large amount of the surface-treating agent and the method which comprises preparatorily decreasing the adsorbed water and the coexisting water and subsequently giving the fine particles a surface treatment with the surface-treating agent. When the surface-treated fine particles are to be finished as a powder while in the presence of the adsorbed water and the coexisting water mentioned above, there arises a disadvantage that the fine particles are liable to agglomerate under the influence of these waters and the finished powder fails to acquire satisfactory dispersibility. As means of allowing the surface treatment to be performed on the fine particles without inducing the phenomenon of agglomeration, Japanese Patent Publication SHO 58(1983)-35,736, for example, discloses a method which comprises dispersing the fine particles in a solution of a surface-coating agent and treating the resultant dispersion in the same powderization apparatus as used in the present invention thereby subjecting the fine particles in the suspension to a surface-coating treatment. This method, however, has a problem of finding greatly limited utility and failing to manifest the effect of treatment fully because the treating agent is not chemically bound fast to the surfaces of the fine particles but is merely deposited physically on the surfaces and, therefore, is possibly peeled off the surfaces by the solvent in which the surface-treated fine particles are to be dispersed again for the convenience of use.

The basic difference between the method of the present invention and the known method described above resides in the fact that the surface treatment mentioned in the former method refers to what enables a compound possessing reactivity with the surfaces of the fines particles to be chemically bonded to the surfaces.

Moreover, the possibility that the compound capable of reacting with and joining to the surfaces of the fine inorganic particles will actually react with the surfaces under the conditions allowing the presence of a large amount of water in the slurry as a raw material and the conditions of production which realize this reaction are disclosed nowhere in any of the patent publications mentioned above.

SUMMARY OF THE INVENTION

The object of this invention is accomplished, in the production of a powder of fine inorganic particles excellent in dispersibility in various solvents from a slurry of the fine inorganic particles containing water, by a method which comprises preparing a slurry as a raw material by incorporating in the aforementioned slurry at least one organic compound selected from the group consisting of (A) methanol and (B) organic compound capable of dissolving water in an amount of not less than 1.0% by weight at 20° C. and forming a two-component azeotropic mixture of water and organic compound having a water content of not less than 4.0% by weight and converting the prepared slurry into powder by the use of a powderization apparatus comprising an externally heatable pipe one end of which serves as a slurry inlet and the other end of which serves as a device for separating the produced powder and a vapor held in a vacuum state and a powder collecting chamber connected to the separating device.

The powder produced by the method of this invention exhibits highly satisfactory dispersibility. When this powder is used as a filler for various coating materials, inks, resins, and cosmetic preparations, for example, the fine particles thereof are easily and homogeneously dispersed in a high filling ratio. The end products thus incorporating the powder, therefore, are enabled to fulfill their functions very efficiently. When the powder is used as a raw material for various molded articles of inorganic material, it allows molded articles of compact texture having a very small void ratio to be produced very easily. Thus, the powder of this invention enjoys high economic utility.

DESCRIPTION OF THE PREFERRED EMBODIMENT

The powder of fine inorganic particles contemplated by the present invention can be produced stably and efficiently even when the slurry of the fine particles as the raw material happens to contain water in a large concentration on the order of several % to some tens of % by incorporating in the slurry a specific organic compound desirably in an amount falling in a specific range and effecting the production by the use of a specific powderization apparatus. The method of this invention is particularly effective in producing a powder of fine particles of metal oxide containing virtually no cohering particle. Further, in accordance with the method of this invention, since a compound reactive with the surfaces of the fine inorganic particles is joined to the surfaces and consequently allowed to impart organic quality to the fine particles, a powder of fine surface-treated inorganic particles which are stable under various working conditions can be produced with high efficiency.

The powder of fine inorganic particles to be produced in accordance with the method of this invention is such that the component particles thereof are substantially equal in shape, average particle diameter, and particle diameter distribution to the fine particles contained in the slurry used as the raw material.

The term "specific powderization apparatus" as used in the present invention refers to an apparatus which comprises a long externally heatable pipe, one end (inlet) of which serves as an inlet for the slurry as the raw material and the other end (outlet) of which serves as a device for separating the powder held in a vacuum state and a powder collecting chamber connected to the separating device. The separating device may be something like a bag filler, for example.

By the use of this powderization apparatus, the powder aimed at is produced from the slurry as the raw material prepared by incorporating therein a specific organic compound. To be specific, this production is carried out as follows. The slurry as the raw material is continuously or intermittently supplied by a metering pump to the long pipe through the inlet. The slurry, during the travel through the interior of the pipe, is converted into the mixture of a powder of fine particles and the vapor of solvent including organic compound. In the separating device, the mixture is divested exclusively of the powder. The separated powder is collected in the powder collecting chamber. In the meantime, the vapor of solvent including organic compound which has been passed through the separating device is liquefied and separated in a condenser disposed next to the separating device. A vacuum device such as a vacuum pump is installed next to the condenser and is utilized for retaining the entire powderization apparatus under a vacuum state.

The fine inorganic particles which are usable in the present invention include fine particles of such metals as silver, copper, irony and aluminum; fine particles of non-oxide type inorganic compounds such as silicon carbide, silicon nitride, aluminum nitride, and boron nitride; fine particles of metal oxides or metal hydroxides having as main components thereof silicon, aluminum, zirconium, magnesium, calcium, strontium, barium, yttrium, vanadium, niobium, tantalum, chromium, molybdenum, tungsten, manganese, iron, cobalt, nickel, copper, silver, zinc, cadmium, boron, gallium, indium, germanium, tin, antimony, and bismuth (hereinafter the metal hydroxides will be embraced in the metal oxides for the sake of description in this invention and they will be collectively referred to as "fine particles of metal oxides"); fine particles of composite oxides such as barium titanate, lead titanate, and zeolite which comprise two or more oxides of the metals mentioned above; fine particles such as of silicon* which have an organic group bonded to the compound of an inorganic element; microcapsulated particles comprising fine organic particles having the outer surface coated with an inorganic compound; and so-called inorganic-organic composite fine particles such as fine particles formed by mere mixing of an inorganic compound and an organic compound, for example. Among those fine particles mentioned above, the fine particles of metal oxides and fine organic-inorganic composite particles prove to be particularly desirable in the sense that they allow the effect of this invention to be conspicuously manifested.

The slurry of fine inorganic particles in a water-containing solvent as the raw material for the powder of fine particles is obtained by the method which comprises wet pulverizing coarse particles of inorganic material in a water-containing solvent, the method which comprises classifying fine particles of inorganic material in a water-containing solvent, the method which comprises placing a powder obtained by a method of dry synthesis in a water-containing solvent and collecting the fine particles of the powder in the solvent, or the method of wet synthesis which comprises placing a metal compound in a solution allowing the presence of water and subjecting the metal compound to hydrolysis, action of a precipitant, or ion exchange thereby converting the solution into a slurry of fine particles of inorganic material, for example.

Among the methods mentioned above, the method of wet synthesis proves to be particularly preferable in the sense that the fine particles in the slurry as the raw material for the powder of fine particles are allowed to be dispersed efficiently and to be produced in a uniform particle diameter. Especially, the fine particles obtained by the method which comprises causing a hydrolyzable and condensable organic metal compound to be hydrolyzed and condensed in an organic solvent in the presence of water of an amount exceeding an equivalent weight for hydrolysis thereby giving rise to a slurry of fine particles of metal oxide or metal hydroxide in the water-containing organic solvent prove to be particularly desirable.

This method is reported in Journal of Colloid and Interface Science, Vol. 26, pages 62–69 (1968) and disclosed in Japanese Patent Laid-Open SHO 62(1987)-148,316, for example.

The term "organic metal compound" as used in refers to a compound possessing a hydrolyzable organic group and exhibiting an ability to form a three-dimensionally (metal-oxygen) bound chain in consequence of hydrolysis. and condensation. The organic metal compounds which answer this description and which are readily available commercially and inexpensively include alkoxy metal compounds of silicon, titanium, aluminum, and zirconium, for example. They are represented by the following general formula I:

$$R^1{}_mM(OR^2)_n \qquad (I)$$

wherein M is a metal element, $R^1$ is at least one group selected from the class consisting of hydrogen atom, substituted or non-substituted alkyl groups of up to 10 carbon atoms, aryl groups, and unsaturated aliphatic residues, $R^2$ is an alkyl group, m is 0 or a positive integer, n is an integer of not less than 1, providing that m+n satisfy the valency of the metal element M, and m $R^1$'s may be different from one another, and n $R^2$'s may be similarly different from one another. The metal elements which are preferably usable as M herein include silicon, titanium, zirconium, and aluminum, for example.

The substituent $R^2$ is preferable to be a lower alkyl group having up to 8 carbon atoms. An alkoxy metal compound satisfying the general formula by having not less than 3 for n can be used by itself. An alkoxy metal compound satisfying the general formula by having 1 or 2 for n may be used in combination with a raw material possessing at least three hydrolyzable organic groups. The typical organic metal compounds which are represented by the aforementioned general formula, $R^1{}_mM(OR^2)_n$, include tetramethoxy silane, tetraethoxy silane, tetraisopropoxy silane, tetrabutoxy silane, trimethoxy silane, triethoxy silane, trimethylmethoxy silane, trimethoxyvinyl silane, triethoxy vinyl silane, 3-blydidoxypropyl trimethoxy silane, 3-chloropropyl-trimethoxy silane, 3-mercaptopropyltrimethoxy silane, 3-(2-aminoethylaminopropyl)trimethoxy silane, phenyltrimethoxy silane, phenyltriethoxy silane, dimethoxydimethyl silane, dimethoxymethyl silane, diethoxymethyl silane, diethoxy-3-glycidoxypropylmethyl silane, 3-chloropropyldimethoxymethyl silane, dimethoxydiphenyl silane, dimethoxymethylphenyl silane, trimethylmethoxy silane, trimethylethoxy silane, dimethylethoxy silane, dimethoxyethoxy silane, titanium tetramethoxide, titanium tetraethoxide, titanium tetraisopropoxide, ditanium tetrabutoxide, titanium diethoxydibutoxide, zirconium tetramethoxide, zirconium tetramethoxide, zirconium tetraisopropoxide, titanium tetra(2-ethylhexyloxide), aluminum triethoxide, aluminum triisopropoxide, aluminum tri-n-butoxide, aluminum tri-sec-butoxide, and aluminum tri-tert-butoxide, for example.

Other preferable organic metal compounds are derivatives of the alkoxy metal compounds mentioned above. For example, those compounds which are derived by having part of the alkoxy group ($OR^2$) substituted by such groups as carboxyl group or $\beta$-dibarbonyl group which are capable of forming a chelating compound and those low condensates which are obtained by partially hydrolyzing the alkoxy metal compounds and alkoxy group-substituted compounds mentioned above.

These other organic metal compounds include acylated compounds of titanium and zirconium such as zirconium acetate, zirconium oxalate, zirconinum lactate, and titanium lactate, and chelate compounds of titanium and zirconium with $\beta$-diketone, hydroxycarboxylic acid, ketoesters, ketoalcohols, aminoalcohols, and quinoline such as titanium acetylacetonate, zirconium acetylacetonate, titanium octylglycolate, and titanium triethanol aminate.

Composite oxides of the organic metal compounds with silicon, titanium, aluminum and/or zirconium may be produced by hydrolyzing the organic metal compounds in the presence of an organic metal compound or an inorganic salt of sodium, potassium, rubidium, cesium, magnesium, calcium, strontium, barium, boron, gallium, or indium, for example. In this case, the oxides of silicon, titanium, aluminum and zirconium are desired to account for a proportion of not less than 70% in atomic ratio.

The slurry of fine particles of metal oxide is produced by placing the organic metal compound in a solvent capable of dissolving at least either of water and the organic metal compound and stirring the solvent thereby causing hydrolysis of the organic metal compound therein.

The solvents which are usable herein include methanol, ethanol, n-propanol, isopropanol, n-butanol, sec-butanol, isobutanol, tert-butanol, acetone, methylethyl ketone, tetrahydrofuran, dioxane, ethylene glycol, propylene glycol, 2-methoxy ethanol, 2-ethoxy ethanol, 2-butoxy ethanol, methyl lactate, ethyl lactate, n-hexane, cyclohexane, benzene, toluene, and xylene, for example. These solvents may be used either singly or in the form of a mixture of two or more members.

The amount of the water to be supplied to the reaction is not less than the equivalent weight of water to be fixed when the organic metal compound is represented by the aforementioned general formula, $R^1{}_m M(OR^2)_n$, and the reaction of hydrolysis by the following formula:

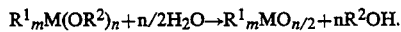

$$R^1{}_m M(OR^2)_n + n/2 H_2O \rightarrow R^1{}_m MO_{n/2} + nR^2OH.$$

The slurry dispersed in a varying water-containing organic solvent is obtained by employing the method described above. In this slurry, fine spherical particles of metal oxide having the diameter thereof controlled freely in the range of 0.1 to 30 μm are formed. By suitably selecting the conditions of hydrolysis, these fine spherical particles are allowed to acquire diameters distributed in a narrow range with a coefficient of variation in the range of 2 to 30%, without entailing the phenomenon of agglomeration.

The method of this invention, therefore, is the optimum way of obtaining a powder of fine particles of metal oxide having a narrow particle diameter distribution without entailing the occurrence of cohering particles from the slurry of such fine particles as mentioned above. The materials of which such fine particles may be formed include oxides of silicon, aluminum, zirconium, and titanium, composites of such oxides, and composite oxides including such other metals as alkali metals and alkaline earth metals, for example.

The slurry of fine inorganic particles which is obtained by the method of wet synthesis contains water in the solvent. When the fine particles are separated from the slurry and then dried, therefore, the occurrence of cohering particles is inevitable. Particularly, the powder of fine particles of a narrow particle diameter distribution mentioned above is not allowed to entrain cohering particles, if very slightly. The slurry of fine particles of metal oxide obtained by hydrolyzing an organic metal compound contains such fine particles in a concentration in the range of 1 to 15% by weight. This slurry can be prepared by incorporation therein of methanol (A) and/or an organic compound (B) as the raw material for passage through the powderization apparatus. It has been ascertained to the inventors that to ensure prevention of the occurrence of cohering particles during the course of powder production, the slurry is desired to be heated to complete the reaction before passage through the apparatus. This is because this heating serves the purpose of completing the hydrolysis and the condensation of the organic metal compound which still persists in the slurry. If this reaction is not completed and the organic metal compound or a low condensate thereof is suffered to remain dissolved in the slurry, the organic metal compound or the low condensate plays the part of a binder and induce agglomeration of fine particles.

Since the degree of completion of the reaction of hydrolysis is variable with the kind of the organic metal compound, the amount of water, and the kind of catalyst, for example, the proper heating temperature cannot be generally specified. This temperature, however, is required to exceed 30° C. and desired to be not less than 50° C. For the sake of completion of the reaction, the heating is preferable to be carried out to the extent of partly vaporizing the solvent in the slurry. It has been further confirmed that so long as the concentration of fine particles in the slurry is controlled within the range of 10 to 40% by weight, the powder free from cohering particle can be obtained even when the efficiency of powder production is enhanced.

More perfect prevention of the occurrence of cohering particle is attained by controlling the amount of water in the slurry as the raw material in the range of 3 to 30% by weight. In the light of the fact that the slurry of fine particles obtained by the conventional method of wet synthesis inevitably entrains water, it is economically disadvantageous to control the water content below the lower limit of the range mentioned above. If the water content exceeds the upper limit of the range, there arises the disadvantage that the efficiency of powder production is degraded.

The characteristic features of the method of the present invention are manifested most conspicuously when the slurry of fine particles of metal oxide obtained as described above is used.

It has been found by the inventors that the powder of fine inorganic particles containing virtually no cohering particle can be produced infallibly with high efficiency by causing the water-containing slurry prepared as raw material by the aforementioned method for supply to the aforementioned apparatus to contain therein a specific organic compound.

The organic compound comprises (A) methanol and/or (B) an organic compound capable of dissolving water in an amount of not less than 1.0% by weight at 20° C. and forming a two-component azeotropic mixture of water and organic compound having a water content of not less than 4.0% by weight.

Besides the properties mentioned above, the organic compound (B) is preferable to have a boiling point of not more than 120° C., preferably not more than 100° C. under normal pressure. This is because the efficiency of powder production is heightened in proportion as the boiling point of the organic compound (B) is lowered. The inventors gather that this relationship is ascribable to the fact that the azeotropic temperature of a given organic compound with water decreases in proportion as the boiling point of the organic compound falls. The desirable organic compound (B) having the boiling point in the aforementioned range under normal pressure may well be defined as what forms the two-component azeotropic mixture with water which has an azeotropic temperature of not more than 95° C.

The kinds of organic compounds capable of forming azeotropic mixtures with water, the azeotropic composition of water in the two-component azeotropic mixtures, and the azeotropic temperature and boiling point under normal pressure are described in Advances in Chemistry Series, vol. 116, Azeotropic Data-III (American Chemical Society, 1973), for example.

When the organic compound (B) having the azeotropic composition of water in the aforementioned range happens to be is such that the solubility of water therein is less than 1.0% by weight, cohering particles occur heavily in the produced powder. When the organic compound capable of dissolving water in a concentration of not less than 1.0% by weight fails to form an azeotropic mixture with water or gives an azeotropic composition of water of less than 4.0% by weight, the produced powder entrains cohering particles conspicuously or the effort to prevent the occurrence of cohering particles degrades the efficiency of powder production.

The data of solubility of water in organic compounds are inserted in Solubilities of Inorganic and Organic Compounds (published by Pergamon Press in 1963) and in The Merck Index of Chemicals and Drugs.

Typical examples of the organic compound (B) are lower aliphatic alcohols of not less than 2 carbon atoms such as ethanol, n-propanol, isopropanol, n-butanol, isobutanol, sec-butanol, tert-butanol, sec-amyl alcohol, n-pentanol, isoamyl alcohol, tert-amyl alcohol, n-hexanol, cyclohexanol, 2-methoxyethanol, 2-ethoxyethanol, 2-butoxyethanol, 3-methoxy-1-butanol, and furfuryl alcohol; alicyclic alcohols; ketones such as methylethyl ketone, diethyl ketone, and cyclohexanone; lower carboxylic esters such as ethyl formate, methyl acetate, ethyl acetate, ethylene glycol diacetate, diethyl maleate, 2-methoxyethyl acetate, and 2-ethoxyethyl acetate; cyclic ethers such as tetrahydrofuran, dioxane, and tetrahydrofuran; nitriles such as acetonitrile and propionitrile; amines such as cyclohexyl amine; and organic acids such as formic acid, propionic acid, butyric acid, isobutyric acid, valeric acid, isovaleric acid, crotonic acid, and methacrylic acid.

Among other examples of the organic compound (B) mentioned above, ethanol, n-propanol, isopropanol, n-butanol, isobutanol, sec-butanol, tert-butanol, sec-amyl alcohol, tert-amyl alcohol, 2-methoxyethanol, methylethyl ketone, diethyl ketone, methyl acetate, ethyl acetate, tetrahydrofuran, dioxane, tetrahydrofuran, acetonitrile, and propionitrile prove to be particularly desirable.

The amount of the organic compound to be incorporated in the slurry is not less than 1.0 times, preferably not less than 2.0 times of the amount of the water contained in the slurry by weight ratio, if the organic compound is methanol (A). Further, if the organic compound is the organic compound (B), the amount of the organic compound is not less than 0.6 times, preferably 0.8 times of the amount of the organic compound (B) calculated to form a two-component azeotropic mixture relative to the water contained in the slurry. The slurry may incorporate both the methanol (A) and the organic compound (B) therein.

When the amounts of these organic compounds are less than their respective lower limits, though the effect of the organic compounds in preventing the phenomenon of agglomeration is still discernible, the efficiency of powder production must be lowered. No upper limit is imposed on the amount of the organic compound. So long as the amount of the organic compound exceeds the lower limit defined above, the organic compound invariably manifests its effect in preventing the phenomenon of agglomeration no matter how far the amount exceeds this limit.

In the execution of the method of this invention, the prevention of the occurrence of cohering particles in the produced powder may be ensured to a greater extent by allowing the slurry as raw material to incorporate therein an organic compound (C) dissolving water in a concentration of not less than 1% by weight at 20° C. and exhibiting a boiling point in the range of 105° to 200° C. under normal pressure in addition to methanol (A) and/or the organic compound (B). In this case, the amount of the organic compound (C) to be incorporated is desired to be 0.1 times the amount of water contained in the slurry by weight ratio. If this amount exceeds 1.0 times the amount of the water, there ensues the disadvantage that the powder free from cohering particle is produced with inferior efficiency. When the organic compound (C) is incapable of forming an azeotropic mixture with water, the amount thereof must be decreased as much as possible.

The organic compounds (C) which are usable herein include polyols such as ethylene glycol, propylene glycol, 1,3-propane diol, glycerol, 1,4-butanediol, 1,3-butane diol, diethylene glycol, and triethylene glycol; carboxylic esters such as methyl lactate and ethyl lactate; and organic acids such as acetic acid and acrylic acids, for example.

In the execution of the method of this invention, when the slurry as raw material is allowed to incorporate a compound (D) possessing a group capable of reacting with the surface of the fine inorganic particles in addition to the organic compounds mentioned above, the powder of fine inoganic particles having the compound (D) bonded to the surfaces thereof and entraining very few cohering particles may be produced with high efficiency.

The compound (D) is preferable to be an organic compound having at least one hydroxyl group in the molecular unit thereof or a coupling agent.

The organic compounds having at least one hydroxyl group in the molecular unit include alcohols of optionally substituted aliphatic, aromatic, and alicyclic hydrocarbons such as methanol, ethanol, n-propanol, isopropanol, n-butanol, isobutanol, sec-butanol, tert-butanol, amyl alcohol, sec-amyl alcohol, n-pentanol, 2-emthyl-1-butanol, isoamyl alcohol, tert-amyl alcohol, n-hexanol, n-decyl alcohol, lauryl alcohol, cyclohexanol, 2-methoxyethanol, 2-ethoxyethanol, 2-butoxyethanol, 3-methoxy-1-butanol, 2-(2-methoxyethoxy)ethanol, 2-(2-ethoxyethoxy)ethanol, diacetone alcohol, furfuryl alcohol, benzyl alcohol, phenol, o-cresol, m-cresol, p-cresol, allyl alcohol, trans-2-buten-1-ol, propagyl alcohol, ethylene glycol, propylene glycol, 1,3-propanediol, 1,4-butanediol, 1,3-butanediol, cis-butene diol, trans-butenediol, 1,6-hexanediol, diethylene glycol, triethylene glycol, glycerol, monoethanol lamine, diethanol amine, ($\pm$)-3-(dimethylamino)-1,2-propanediol, dimethyl ethanol amine, 1-dimethylamino-2-propanol, 3-dimethylamino-1-propanol, 2-cyaloethanol, and 2,2'-thiodiethanol, for example. If the above-mentioned organic compound (B) or (C) is the alcohols, these organic compounds having a hydroxy group may be the same as the organic compound (B) or (C).

The coupling agents of the silane type, titanate type, and aluminum type prove to be desirable in the sense that they are readily available commercially. The coupling agents which are usable herein include silane type coupling agents possessing at least one (substituted) alkyl group, substituted) phenyl group, vinyl group, etc. in the molecular unit thereof such as alkoxy silanes including methyl trimethoxy silane, phenyl trimethoxy silane, benzyl trimethoxy silane, methyl triisopropoxy silane, 3-chloropropyl trimethoxy silane, dimethoxy dimethyl silane, diethoxy methylphenyl silane, ethoxy trimethyl silane, 3-aminopropyltriethoxy silane, 3-(2-aminoethylaminopropyl) trimethoxy silane, (N,N-dimethyl-3-aminopropyl) trimethoxy silane, 3-glycidoxypropyl trimethoxy silane, allyl triethoxy silane, and vinyl triethoxy silane, chlorosilanes including trimethyl chlorosilane and diethyl dichlorosilane, and acetoxysilanes including acetoxy triethyl silane, diacetoxy diphenyl silane and triacetoxy vinyl silane; titanate type coupling agents such as isopropyl triisostearoyl titanate and bis(dioctyl pyrophosphate)oxyacetate titanate; and aluminum type coupling agents such as acetoalkoxy aluminum diisopropilate, for example. These are not exclusive examples. They may be used either singly or in the form of a mixture of two or more members.

The kind of the compound (D) and the amount of use thereof are variable with the kind and concentration of the fine particles in the slurry. When the compound (D) happens to be an alcohol, the amount thereof to be used is only required to be not less than 0.01 part by weight, based on 1 part by weight of the fine particles. When the compound (D) is a coupling agent, the amount thereof is desired to be in the range of 0.001 to 0.1 part by weight, based on 1part by weight of the fine particles. The effect of surface treatment is not sufficient when the amount of the compound (D) is less than the lower limit defined above. When this compound (D) is above the upper limit, the use of the compound is effective but not economical.

The term "surface treatment" as used herein refers to a reaction which induces chemical bonding as by interesterification or condensation between the $-M^1-OH$ group (wherein $M^1$ stands for the metallic element as a component of the fine particles) on the surface of the fine particles and the compound (D).

The slurry of fine particles obtained by the method of wet synthesis contains water in the solvent. The surface treatment is not easily attained, therefore, by placing the compound (D) in the slurry and heating the slurry as it is. The powder obtained from the slurry incorporating the compound (D) tends to entrain cohering particles conspicuously. The conspicuous occurrence of cohering particles may be logically explained by a postulate that the $-M^1-OH$ group persists in a large amount on the surface of the fine particles when the fine particles are converted into the powder as a finished product.

It has been found by the inventors that the powder of fine inorganic particles having the surfaces thereof treated with the compound (D) and entraining virtually no cohering particles can be produced by allowing the water-containing slurry of fine particles to incorporate therein the aforementioned organic compounds and the compound (D) thereby preparing the slurry as raw material and subjecting the slurry as raw material to powderization by the use of a specific powderization apparatus.

It has been further confirmed by the inventors that when the slurry of fine particles is obtained by hydrolyzing an organic metal compound in a water-containing solvent and the powder is formed of the fine surface-treated particles of metal oxide obtained by the method described above, this powder is required to be calcined at a temperature exceeding the temperature at which the organic group bonded to the surfaces of the fine particles is decomposed, to give rise to a commercially advantageous raw material for a powder of fine porous particles of metal oxide satisfying all of the physical properties to be described below and entraining only very few cohering particles. To be specific, the fine porous particles should possess a spherical shape, a diameter in the range of 0.1 to 30 $\mu$m, and a coefficient of variation of particle diameters in the range of 2 to 30% and satisfy the expression, $S \times d \times \rho > 30$, (wherein S is the specific surface area ($m^2/g$) of the powder of fine particles measured by the BET method, d is the number average particle diameter (m) measured by observation under an electron micrograph, and $\rho$ is the bulk density ($g/m^3$) of the powder of fine particles). In this case, the alcohol is desired to have at least two carbon atoms.

Generally, truly spherical non-porous particles having a smooth surface satisfy the relation: $S \times d \times \rho = 6$.

The temperature at which the organic group is decomposed exceeds 300° C., preferably 800° C., though variable with the kind of the organic group.

The operating conditions of the powderization apparatus of the present invention are not specifically defined. The operating temperature of this apparatus is only required to exceed the dew points under the operating pressure of the solvent, the organic compound (A), (B), (C), and the compound (D) contained in the slurry as raw material. The operating pressure is below the atmospheric pressure and is required to allow stable and inexpensive operation of the apparatus. The pressure in the powder collecting chamber is desired to be in the range of 20 to 500 Torrs.

Now, the present invention will be described specifically below with reference to working examples, which are intended to be merely illustrative of and not in any sense limitative of the invention. The shape of fine particles, the average particle diameter, the coefficient of variation of particle diameter, the particle diameter distribution, the specific surface area and density of powder, and the concentration of fine particles and the content of water in the slurry as mentioned in referential examples and the working examples were determined as follows.

Shape and average diameter of fine particles

The shape of fine particles was found by examining an image of sample particles observed under a transmission type electron microscope at 50,000 magnifications. The average particle diameter (d) was determined by actually measuring diameters (Di) of not less than 100 sample particles (number of particles under test=n) and performing calculation of the following formula. The particle diameters were obtained by averaging major diameters and minor diameters of the individual particles. When sample particles entrained cohering particles, clusters of cohering particles were reckoned each as one particle.

$$d = \sum_{i=1}^{n} Di/n$$

Coefficient of variation of particle diameters

The coefficient of variation was determined by performing calculation of the following formula, using the numerical values of Di and d actually found by the method described above.

$$\text{Coefficient of variation (\%)} = \sqrt{\frac{\sum_{i=1}^{n}(d - Di)^2}{n - 1}} / d \times 100$$

Particle diameter distribution

The slurries obtained in referential examples and the slurries obtained by dispersing the powders obtained in working examples and controls in varying solvents were treated with a centrifugal sedimentation type particle diameter distribution tester (produced by Shimadzu Seisakusho Ltd. and marketed under product code of "SA-CP3") to test for particle diameter distribution.

Specific surface area of powder

Sample powders obtained by calcination of the powders obtained in the working examples and controls in the open air at temperatures varied in the range of 400° to 800° C. for 5 hours were tested for the specific surface area by the BET method.

Density of powder

The same sample powders as used for the determination of specific surface area were tested for density by the use of an autopictometer (produced by Shimadzu Seisakusho Ltd. and marketed under product code of 1320).

Fine particle concentration in slurry

Accurately weighed samples of the slurries of fine particles obtained in referetntial examples were distilled to expel solvents. The remaining particles were calcined at 1,000° C. The fine particles remaining after the firing were weighed accurately to find the concentrations in % by weight.

Water content of slurry

The slurries of fine particles obtained in work referential examples were tested for water content by the Carl Fischer method.

Preparation of slurry of fine inorganic particles

The water contents of the slurries obtained in the following referential examples and the physical properties of the fine particles contained in the slurries are shown in Table 1.

Referential Example 1-(1)

A mixture of 25 kg of coarse silicon carbide particles with 50 kg of water was subjected to wet pulverization by the use of an eccentric shaking mill to obtain a slurry of fine silicon carbide particles. The fine particles consequently obtained had an average particle diameter of 2.5 um, a coefficient of particle diameter variation of 47%, and contain 10% by weight of coarse particles exceeding 10 μm in diameter and 2% by weight of coarse particles exceeding 20 μm in diameter.

Referential Example 1-(2)

A slurry of fine mullite particles was obtained by wet pulverizing a mixture of 25 kg of coarse mullite particles, 3 kg of water, and 97 kg of ethyl acetate by the use of an eccentric shaking mill.

Referential Example 1-(3)

A slurry of fine mullite particles was obtained by repeating the procedure of Referential Example 1-(2), except that acetone was used in the place of ethyl acetate.

Referential Example 1-(4)

A suspension of fine hydrated composite yttria-zirconia particles (yttria content 10 mol % as oxide) was obtained by hydrolyzing an aqueous solution of yttrium chloride and zirconium chloride (0.1 mol/liter) by the addition of aqua ammonia. The suspension was filtered and the particles consequently separated were thoroughly washed with purified water to produce a cake. This cake was dispersed in purified water to obtain a slurry of fine particles.

Referential Example 1-(5)

A slurry comprising fine spherical particles of silica (5.6% by weight), acetone (69.8% by weight), water (14.3% by weight), methanol (7.4% by weight), and ammonia (2.9% by weight) was obtained by adding a solution comprising 50 kg of partial condensate of tetramethoxy silane (average tetramer) and 160 kg of acetone to a solution comprising 45 kg of 30% aqua ammonia, 35 kg of water, and 160 kg of acetone, mixing them homogeneously, and allowing the resultant mixture to stand at rest.

Referential Example 1-(6)

A slurry of fine silica particles was obtained by dissolving 6 kg of ammonia in a mixed solution comprising 26 kg of water and 102 kg of methanol, adding 1 kg of fine spherical perfectly discrete silica particles having an average particle diameter of 5.0 μm to the resultant solution, thoroughly dispersing the added fine particles in the solution, and gradually adding 66 kg of tetramethoxy silane to the dispersion thereby causing growth of the particles. The slurry was composed of fine spherical silica particles (13.4% by weight), methanol (78.4% by weight), water (5.2% by weight), and ammonia (3.0% by weight).

Referential Example 1-(7)

A slurry composed of fine spherical alumina particles (1.9% by weight), water (12.2% by weight), ammonia (4.2% by weight), and isopropyl alcohol (81.7% by weight) was obtained by stirring a solution comprising 228 kg of water, 72 kg of ammonia, and 1,640 liters of isopropyl alcohol and gradually adding 130 kg of triisopropoxy aluminum to the stirred solution thereby inducing hydrolysis and condensation.

Referential Example 1-(8)

A slurry composed of fine spherical zirconia particles (3.5% by weight), water (1.4% by weight), n-propanol (86.5% by weight), and n-butanol (8.5% by weight) was obtained by stirring a solution comprising 44 kg of water and 1,880 liters of n-propanol and adding 82 kg of tetra-n-butoxy zirconium to the stirred solution thereby inducing hydrolysis and condensation.

Referential Example 1-(9)

A slurry composed of fine spherical titania particles (1.5% by weight), water (1.6% by weight), methanol (92.5% by weight), and isopropanol (4.4% by weight) was obtained by stirring a solution comprising 36 kg of water and 1,880 liters of methanol and gradually adding 86 kg of tetraisopropoxy titanium to the stirred solution thereby inducing hydrolysis and condensation.

Referential Example 1-(10)

A two-layer composite consisting of a lower layer of water and an upper layer of methyl trimethoxy silane was obtained by pouring 600 kg of methyl trimethoxy silane to a homogeneous solution comprising 4,000 kg of water and 50 kg of 28% aqua ammonia. The composite was gently stirred without disrupting the two separate layers thereby inducing hydrolysis and condensate in the interface. After 5 hours' stirring, the upper layer vanished and a single-phase slurry was formed. This slurry was composed of fine spherical polymethyl silsesquioxane ($CH_3SiO_{3/2}$) particles 6.4% by weight), water (84.2% by weight), ammonia (0.3% by weight), and methanol (9.1% by weight).

Preparation of slurry of powder as raw material

The names of organic compounds incorporated in slurries as raw material, the weight ratios of organic compounds to water in slurries, solubilities of water in organic compounds at 20° C. (expressed by amounts of water (in g), $S_w$, contained in 100 g of organic compounds in which was dissolved to saturation at 20° C.), the boiling points of organic compounds under normal pressure (Bp), the azeotropic compositions of water, $C_w$, in azeotropic mixtures possibly formed between organic compounds and water, the weight ratios (k) of amounts of organic compounds incorporated in slurries as raw material to amounts of organic compounds calculated to participate in the formation of two-component azeotropic mixtures with water in slurries, the concentration, the concentrations (% by weight) of fine particles in slurries as raw material, and the like are shown in Table 2.

Referential Example 2-(1)

A homogeneous slurry of silicon carbide as raw material was produced by mixing 75 kg of the slurry of fine silicon carbide particles obtained in Referential Example 1 with 40 kg of methanol.

Referential Example 2-(2)

A slurry of silicon carbide as raw material was produced by repeating the procedure of Referential Example 2-(1), except that the amount of methanol was changed to 90 kg.

Referential Example 2-(3)

A slurry of silicon carbide as raw material was obtained by repeating the procedure of Referential Example 2-(1), except that methanol was replaced with the same amount of water.

Referential Example 2-(4)

A slurry of silicon carbide as raw material was obtained by repeating the procedure of Referential Example 2-(1), except that methanol was replaced with the same amount of ethylene glycol.

Referential Example 2-(5)

The slurry of fine mullite particles obtained in Referential Example 1-(2) was used in its unmodified form as raw material.

Referential Example 2-(6)

A slurry as raw material was obtained by mixing 125 kg of the slurry of fine mullite particles obtained in Referential Example 1-(3) with 30 kg of toluene.

Referential Example 2-(7)

A homogeneous slurry as raw material was obtained by mixing 60 kg of the slurry of fine hydrated composite yttrium-zirconia particles obtained in Referential Example 1-(4) with 220 kg of methylethyl ketone.

Referential Example 2-(8)

A slurry as raw material was obtained by repeating the procedure of Referential Example 2-(7), except that the amount of methylethyl ketone was changed to 102 kg.

Referential Example 2-(9)

A slurry as raw material was obtained by repeating the procedure of Referential Example 2-(7), except that 25.8 kg of 2-methoxyethyl acetate was used in the place of 220 kg of methylethyl ketone.

Referential Example 2-(10)

A slurry as raw material was produced by repeating the procedure of Referential Example 2-(7), except that 66.5 kg of n-propanol was used in the place of 220 kg of methylethyl ketone.

Referential Example 2-(11)

A slurry as raw material was produced by repeating the procedure of Referential Example 2-(7), except that 50 kg of methanol was used in the place of 220 kg of methylethyl ketone.

Referential Example 2-(12)

A slurry as raw material was obtained by repeating the procedure of Referential Example 2-(11), except that acetone was used in the place of methanol.

Referential Example 2-(12)

A slurry as raw material was obtained by mixing 110 kg of the slurry obtained in Referential Example 2-(12) with 50 kg of propylene glycol.

Referential Example 2-(12)

A slurry as raw material was obtained by mixing 110 kg of the slurry obtained in Referential Example 2-(12) with 50 kg of cyclohexanone.

Referential Example 2-(15)

The slurry of fine spherical silica particles obtained in Referential Example 1-(5) was used in its unmodified form as raw material.

Referential Example 2-(16)

The slurry of fine slurry of fine spherical silica particles obtained in Referential Example 1-(6) was used in its unmodified form as raw material.

Referential Example 2-(17)

In an externally heatable distillation kettle provided with a stirrer, the slurry of fine spherical silica particles obtained in Referential Example 1-(6) was heated at a slurry temperature of not less than 60° C. for 2 hours. The solvent which was vaporized in the meantime was condensed and removed from the system. Consequently, there was obtained a slurry as raw material which was composed of fine spherical silica particles (23.4% by weight), methanol (63.2% by weight), water (13.3% by weight), and ammonia (0.1% by weight).

Referential Example 2-(18)

A slurry as raw material was obtained by adding to the slurry of fine spherical silica particles obtained by the heat treatment in Referential Example 2-(17) 0.3 part by weight of ethylene glycol, based on 1 part by weight of silica.

Referential Example 2-(19)

In an an externally heatable distillation kettle provided with a stirrer, the slurry of fine spherical alumina particles obtained in Referential Example 1-(7) was heated at a slurry temperature of 81° C. for 2 hours to expel part of the solvent and, at the same time, effecting heat treatment. Consequently, a slurry as raw material was obtained which was composed of fine spherical alumina particles (10.5% by weight), water (16.0% by weight), and isopropyl alcohol (73.5% by weight ).

Referential Example 2-(20)

The slurry of fine spherical zirconia particles obtained in Referential Example 1-(8) was used in its unmodified form as raw material.

Referential Example 2-(21)

In an externally heatable distillation kettle provided with a stirrer, the slurry of fine spherical titania particles obtained in Referential Example 1-(9) was heated to a temperature above 50° C. for 1 hour to expel part of the solvent and, at the same time, effect heat treatment. Thus, a slurry as raw material was produced which was composed of fines pherical titania particles (8.0% by weight), water (4.8% by weight), methanol (82.4% by weight), and isopropyl alcohol (4.8% by weight).

Referential Example 2-(22)

A concentrated slurry was obtained by subjecting the slurry of fine spherical polymethyl silsesquioxane particles obtained in Referential Example 1-(10) to heat treatment in the same manner as in Referential Example 2-(21). This concentrated slurry was composed of fine particles (26.5% by weight), water (72.3% by weight), and methanol (1.2% by weight). A slurry as raw material was obtained by mixing 100 kg of the concentrated slurry with 11.0 kg of propionic acid.

Referential Example 2-(23)

A slurry as raw material was produced by throughly mixing 55 kg of the slurry of fine particles of methanol-added yttria-zirconia composite hydrate obtained in Referential example 2-(11) with 0.27 kg of phenyl trimethoxy silane.

Referential Example 2-(24)

A slurry as raw material was obtained by adding to the slurry of fine spherical silica particles obtained by the heat treatment in Referential Example 2-(17) 0.05 part by weight of 3-aminopropyl triethoxy silane, based on 1 part by weight of silica.

Production of powder of fine inorganic particles

The powders obtained in the following working examples and controls were tested for dispersibility in varying solvents as follows.

5 g of a sample powder was added to 100 ml of a varying solvent, i.e. methylethyl ketone (MEK), toluene, methylmethacrylate (MMA), or water and treated under fixed conditions with a supersonic homogenizer for 20 fines for dispersion of the powder in the solvent. The resultant dispersion was analyzed to determine diameter distribution of the particles. The result of this test was rated on the three-point scale, wherein ⊙ is substantial equality between the found particle diameter distribution and the particle diameter distribution of the corresponding particles in the slurry obtained in Referential Example 1 and absence of cohering particles, is slight deviation of the found particle diameter distribution toward larger particle diameters and inconspicuous presence of cohering particles, and x is heavy deviation of the found particle diameter distribution and conspicuous presence of cohering particles. The data of particle diameter distribution given in Table 4 were those obtained of a dispersion using MEK.

The fact that when the fine inorganic particles were those of metal oxide and the compound (D) was incorporated in the slurry as raw material, the compound (D) was bound to the surfaces of the fine particles of the produced powder was confirmed by dispersing a sample of the powder with an infrared spectrophotometer and examining the absorption spectrum. Separately, the amount of the bound compound (D) was determined as follows. A sample powder of accurate known weight approximating 10 g was placed in an aqueous 0.05N NaOH solution and allowed to undergo hydrolysis at room temperature for 10 hours. Since the compound (D) liberated by hydrolysis passed into the aqueous solution, the amount of the compound (D) in the aqueous solution was determined by gas chromatography. The fact that the compound (D) was bound to the surfaces of the fine particles of a powder was confirmed by keeping a sample of the powder stirred in a varying solvent at room temperature for one week and finding no change of property of the sample powder before and after the one week's stirring.

EXAMPLE 1

A long pipe of stainless steel measuring 8 mm in inside diameter and 8 m in length was kept heated by passing compressed steam through a jacket covering the long pipe. The slurry of fine silicon carbide particles obtained as raw material in Referential Example 2-(1) was continuously supplied by a metering pump into the long pipe through one end (slurry inlet). The other end of the long pipe was maintained under a fixed degree of vacuum and connected to a bag filter adapted to separate the powder from the vaporized solvent. The powder of fine silicon carbide particles separated in the bag filter was collected in a powder collecting chamber kept under the same degree of vacuum. The operating conditions for the powderization are shown in Table 3. After 5 hours continuous operation of this apparatus, fine particles were deposited inside the long pipe serving as an evaporation tube. The long pipe only needed a wash to be safely operated again under the same conditions as before. The properties of the powder are shown in Table 4.

Control 1

A semicylindrical kneader having an inner volume of 30 liters and provided with a horizontal stirring device having a spiral stirring blade attached to a stirring shaft was used as an apparatus for powderization. The kneader was provided with a jacket and the compressed steam (200° C.) passed through the jacket served as a heating source for vaporizing the solvent in the slurry. The kneader was adapted so that the interior thereof could be maintained under a fixed degree of vacuum.

The kneader was charged with the slurry of fine silicon carbide particles obtained as raw material in Referential Example 2-(1). The solvent in the slurry was vaporized by keeping the kneader interior under 200 Torrs and heating the slurry with the compressed steam passed through the jacket. The slurry as raw material was additionally supplied to the kneader by the metering pump to maintain the slurry level inside the kneader constant. After this operation of the kneader was continued for 3 hours, the heating of the kneader was continued and the supply of the slurry as raw material was discontinued. When the temperature of the powder reached 150° C., the application of heat and the application of vacuum were stopped and the powder of fine silicon carbide particles consequently formed was removed. The physical properties of the powder are shown in Table 4.

EXAMPLE 2

A powder of silicon carbide was produced by following the procedure of Example 1, except that the slurry obtained in Referential Example 2-(2) was used instead as raw material. Even after 5 hour's continuous operation, no deposition of fine particle occurred inside the long pipe. The operating conditions and the properties of the produced powder are shown in Table 3 and Table 4.

Controls 2 and 3

Powders of silicon carbide were obtained by repeating the procedure of Example 1, except that the slurries obtained respectively in Referential Example 2-(3) and Referential Example 2-(4) were used as raw materials instead. In either case, the supply of the slurry as raw material could not be continued after 30 fine's operation. Examination of the long pipe revealed that fine particles were deposited heavily in the inlet of the long pipe. The produced powders entrained numerous cohering particles. The operating conditions and the properties of the produced powders are shown in Table 3 and Table 4.

EXAMPLE 3

A powder of mullite was produced by following the procedure of Example 1, except that the slurry obtained as raw material in Referential Example 2-(5) was used instead. Even after 5 hour's continued operation, neither adhesion nor deposition of fine particle was found inside the long pipe. The operating conditions and the properties of the produced powders are shown in Table 3 and Table 4.

Control 4

A powder of mullite was obtained by following the procedure of Example 1, except that the slurry obtained as raw material in Referential Example 2-(6) was used instead. After 1 hour's continued operation, the supply of the slurry as raw material could not be continued further. Observation of the interior of the long tube revealed that fine particles were deposited fast heavily in the inlet. The produced powder entrained numerous cohering particles. The operating conditions and the properties of the produced powders are shown in Table 3 and Table 4.

EXAMPLES 4 to 9

Powders of fine hydrated composite yttria-zirconia particles were produced by following the procedure of Example 1, except that the slurries obtained as raw materials in Referential Examples 2-(7) to (11) and 2-(14) were used instead. In these working examples, the operations could be stably continued and the produced powders exhibited highly satisfactory dispersibility. In Examples 5, 6, and 9 in which the slurries obtained as raw materials in Referential Examples 2-(8), 2-(9), and 2-(14), however, the powders had to be obtained in smaller amounts than in the other working examples to ensure production of powders free from cohering particles. The operating conditions and the properties of the produced powders are shown in Table 3, Table 4, and Table 5.

Controls 5 and 6

Powders were obtained by following the procedure of Control 1, except that the slurries obtained as raw materials in Referential Examples 2-(7) and 2-(10) were used instead. The properties of the produced powders are shown in Table 4 and Table 5.

Controls 7 and 8

Powders were obtained by following the procedure of Example 1, except that the slurries obtained as raw materials in Referential Examples 2-(12) and 2-(13) were used instead. In either case, however, the operation could not be continued for more than 1 hour because fine particles were deposited fast inside the long pipe. The operating conditions and the properties of the produced powders are shown in Table 3 and Table 4.

EXAMPLE 10

A powder of silica was produced by following the procedure of Example 1, except that the slurry obtained as raw material in Referential Example 2-(15) was used instead. Under the operating conditions shown in Table 3, the powder produced exhibited satisfactory dispersibility. When the feed rate of the slurry as raw material was increased to 1.3 times the feed rate shown in the table, however, the produced powder exhibited inferior dispersibility. Even in this case, the operation could be continued. The properties of the powder are shown in Table 4 and Table 5.

EXAMPLES 11 to 19

Powders were produced by following the procedure of Example 1, except that the slurries obtained as raw materials in Referential Examples 2-(16) to 2-(24) were used instead. In these working examples, the operations could be continued safely for 5 hours and were found to be continued further. The operating conditions and the properties of the produced powders are shown in Table 3, Table 4, and Table 5.

Controls 9 and 10

Powders of silica were produced by following the procedure of Control 1, except that the slurries obtained as raw materials in Referential Examples 2-(17) and 2-(18) were used instead. The properties of the produced powders are shown in Table 4 and Table 5.

EXAMPLE 20

A powder of fine porous particles was produced by causing the powder of fine spherical silica particles obtained in Example 11 to be fired in the atmosphere of air at 400° C. for 5 hours. This powder contained virtually no cohering particle and excelled in dispersibility. The results are shown in Table 6.

EXAMPLES 21 to 24

Powders of porous particles were produced by firing the powders of fine spherical silica, alumina, zirconia, and titania particles obtained in Examples 13 and 16 in the same manner as in Example 20. The results are shown in Table 6.

Control 11

The powder of fine spherical silica particles obtained in Control 10 was fired in the same manner as in Example 20. The results are shown in Table 6.

TABLE 1

| Reference Example No. | Name of particles | Slurry of inorganic particles | | | |
|---|---|---|---|---|---|
| | | Average particle size ($10^{-6}$m) | Variation coefficient of particle size (%) | Distribution of particle size (wt %) | Water content of slurry (wt %) |
| 1-(1) | SiC | 2.5 | 47 | >10 μm, 10 >20 μm, 2 | 66.7 |
| 1-(2) | mullite | 1.7 | 41 | >5 μm, 14 >10 μm, 5 | 2.4 |
| 1-(3) | mullite | 1.7 | 42 | >5 μm, 15 >10 μm, 5 | 2.4 |
| 1-(4) | $Y_2O_3$-$ZrO_2$ | 0.15 | 18 | >0.3 μm, 20 >0.5 μm, 3 | 70.0 |
| 1-(5) | silica | 0.60 | 10 | >1.0 μm, 8 >3.0 μm, 2 | 14.3 |
| 1-(6) | silica | 10.2 | 7 | >13 μm, 5 >15 μm, 1 | 5.2 |
| 1-(7) | alumina | 0.10 | 15 | >0.3 μm, 15 >0.5 μm, 2 | 12.2 |
| 1-(8) | zirconia | 0.62 | 4 | >1.0 μm, 6 >3.0 μm, 0 | 1.4 |
| 1-(9) | titania | 0.43 | 6 | >1.0 μm, 4 >2.0 μm, 1 | 1.6 |
| 1-(10) | polymethyl silsesquioxane | 2.0 | 8 | >5.0 μm, 3 >8.0 μm, 0 | 84.2 |

TABLE 2

| Reference Example No. | Raw slurry of powder | | | | | |
|---|---|---|---|---|---|---|
| | Organic compound coexisted | | | | | Concentration of particle (wt %) |
| | Name | Sw (wt %) | Bp (°C.) | Cw (wt %) | Weight ratio to water | k | |
| 2-(1) | methanol | ∞ | 64.7 | — | 0.80 | — | 21.7 |
| 2-(2) | methanol | ∞ | 64.7 | — | 1.80 | — | 15.2 |
| 2-(3) | — | — | — | — | 0 | — | 21.7 |
| 2-(4) | ethylene glycol | ∞ | 197.6 | — | 0.80 | — | 21.7 |
| 2-(5) | ethyl acetate | 3.0 | 77.2 | 8.5 | 32.3 | 3.0 | 20.0 |
| 2-(6) | toluene | 0.045 | 110.6 | 19.6 | 10.0 | 2.4 | 16.1 |
| | acetone | ∞ | 56.5 | — | 32.3 | — | |
| 2-(7) | methyl ethyl ketone | ∞ | 79.6 | 11.0 | 5.2 | 0.65 | 6.4 |
| 2-(8) | methyl ethyl ketone | ∞ | 79.6 | 11.0 | 2.4 | 0.30 | 11.1 |
| 2-(9) | 2-methoxy ethyl acetate | ∞ | 144.6 | 51.5 | 0.61 | 0.65 | 21.0 |
| 2-(10) | n-propanol | ∞ | 97.3 | 29.1 | 1.6 | 0.65 | 14.2 |
| 2-(11) | methanol | ∞ | 64.7 | — | 1.2 | — | 16.4 |
| 2-(12) | acetone | ∞ | 56.5 | — | 1.2 | — | 16.4 |
| 2-(13) | propytene glycol | ∞ | 188.2 | — | 1.2 | — | 11.3 |
| | acetone | ∞ | 56.5 | — | 1.2 | — | |
| 2-(14) | cyclohexanone | 8.4 | 155.6 | 55 | 1.2 | 1.5 | 11.3 |
| | acetone | ∞ | 56.5 | — | 1.2 | — | |
| 2-(15) | methanol | ∞ | 64.7 | — | 0.52 | — | 5.6 |
| | acetone | ∞ | 56.5 | — | 4.9 | — | |
| 2-(16) | methanol | ∞ | 64.7 | — | 15.1 | — | 13.4 |
| 2-(17) | methanol | ∞ | 64.7 | — | 4.8 | — | 23.4 |
| 2-(18) | methanol | ∞ | 64.7 | — | 4.8 | — | 21.9 |
| | ethylene glycol | ∞ | 197.6 | — | 0.53 | — | |
| 2-(19) | isopropanol | ∞ | 82.5 | 12.0 | 4.6 | 0.63 | 10.5 |
| 2-(20) | n-propanol | ∞ | 97.3 | 29.1 | 61.8 | 25.3 | 3.5 |
| | n-butanol | 20.1 | 117.4 | 42.5 | 6.1 | 4.5 | |
| 2-(21) | methanol | ∞ | 64.7 | — | 17.2 | — | 8.0 |
| | isopropanol | ∞ | 82.5 | 12.0 | 1.0 | 0.14 | |
| 2-(22) | methanol | ∞ | 64.7 | — | 0.02 | — | 23.9 |
| | propionic acid | ∞ | 141.4 | 82.2 | 0.15 | 0.70 | |
| 2-(23) | methanol | ∞ | 64.7 | — | 1.2 | — | 16.3 |

TABLE 2-continued

| Reference Example No. | Raw slurry of powder | | | | | |
|---|---|---|---|---|---|---|
| | Organic compound coexisted | | | | | |
| | Name | Sw (wt %) | Bp (°C.) | Cw (wt %) | Weight ratio to water | k | Concentration of particle (wt %) |
| 2-(24) | methanol | ∞ | 64.7 | — | 4.8 | — | 23.1 |

TABLE 3

| No. | Condition of powderization | | | Yield of powder (kg/hr) |
|---|---|---|---|---|
| | Temperature of eraporating tube (°C.) | Pressure (Torr) | Charging speed of raw slurry (kg/hr) | |
| Example 1 | 200 | 200 | 10 | 2.2 |
| Example 2 | 200 | 200 | 15 | 2.3 |
| Control 2 | 200 | 200 | 10 | — |
| Control 3 | 200 | 200 | 10 | — |
| Example 3 | 200 | 100 | 20 | 4.0 |
| Control 4 | 200 | 100 | 20 | — |
| Example 4 | 200 | 100 | 45 | 2.9 |
| Example 5 | 200 | 100 | 20 | 2.2 |
| Example 6 | 200 | 100 | 10 | 2.1 |
| Example 7 | 200 | 100 | 25 | 3.6 |
| Example 8 | 200 | 100 | 20 | 3.3 |
| Example 9 | 200 | 100 | 15 | 1.7 |
| Control 7 | 200 | 100 | 15 | — |
| Control 8 | 200 | 100 | 15 | — |
| Example 10 | 200 | 200 | 50 | 2.8 |
| Example 11 | 180 | 300 | 35 | 4.7 |
| Example 12 | 180 | 300 | 20 | 4.7 |
| Example 13 | 180 | 300 | 20 | 4.4 |
| Example 14 | 200 | 200 | 25 | 2.6 |
| Example 15 | 200 | 100 | 70 | 2.5 |
| Example 16 | 200 | 100 | 50 | 4.0 |
| Example 17 | 200 | 100 | 20 | 4.8 |
| Example 18 | 200 | 100 | 20 | 3.3 |
| Example 19 | 180 | 300 | 20 | 4.6 |

TABLE 4

| No. | No. of Referential Example of slurry used | Properties of powder | | | | | | | |
|---|---|---|---|---|---|---|---|---|---|
| | | Name of powder and shape of fine particle | Average particle size ($10^{-6}$m) | Variation coefficient of particle size (%) | Dispersibility to solvent | | | | Distribution of particle size (wt %) |
| | | | | | MEK | toluene | MMA | water | |
| Example 1 | 2-(1) | SiC irregular | 2.7 | 50 | ◯ | no | X | ◯ | >10 μm, 13 >20 μm, 5 |
| Control 1 | 2-(1) | SiC irregular | 4.7 | 56 | X | no | X | X | >10 μm, 21 >20 μm, 8 |
| Example 2 | 2-(2) | SiC irregular | 2.6 | 48 | ◉ | no | ◯ | ◉ | >10 μm, 11 >20 μm, 2 |
| Control 2 | 2-(3) | SiC irregular | 4.2 | 54 | X | no | X | X | >10 μm, 18 >20 μm, 6 |
| Control 3 | 2-(4) | SiC irregular | 3.7 | 52 | X | no | X | X | >10 μm, 16 >20 μm, 6 |
| Example 3 | 2-(5) | mullite irregular | 1.7 | 42 | ◉ | no | ◯ | ◉ | >5 μm, 15 >10 μm, 5 |
| Control 4 | 2-(6) | mullite irregular | 3.1 | 50 | X | no | X | X | >5 μm, 20 >10 μm, 9 |
| Example 4 | 2-(7) | $Y_2O_3$-$ZrO_2$ irregular | 0.15 | 18 | ◉ | no | ◯ | ◉ | >0.3 μm, 21 >0.5 μm, 3 |
| Example 5 | 2-(8) | $Y_2O_3$-$ZrO_2$ irregular | 0.18 | 20 | ◯ | no | ◯ | ◯ | >0.3 μm, 23 >0.5 μm, 5 |
| Example 6 | 2-(9) | $Y_2O_3$-$ZrO_2$ irregular | 0.19 | 21 | ◯ | no | ◯ | ◉ | >0.3 μm, 24 >0.5 μm, 5 |
| Example 7 | 2-(10) | $Y_2O_3$-$ZrO_2$ irregular | 0.15 | 18 | ◉ | ◯ | ◉ | no* | >0.3 μm, 20 >0.5 μm, 3 |
| Example 8 | 2-(11) | $Y_2O_3$-$ZrO_2$ irregular | 0.17 | 19 | ◯ | no | ◯ | ◉ | >0.3 μm, 23 >0.5 μm, 4 |
| Example 9 | 2-(14) | $Y_2O_3$-$ZrO_2$ irregular | 0.18 | 17 | ◯ | no | ◯ | ◉ | >0.3 μm, 23 >0.5 μm, 5 |
| Control 5 | 2-(7) | $Y_2O_3$-$ZrO_2$ irregular | 0.35 | 40 | X | no | X | X | >0.3 μm, 47 >0.5 μm, 16 |
| Control 6 | 2-(10) | $Y_2O_3$-$ZrO_2$ irregular | 0.31 | 33 | X | no | X | X | >0.3 μm, 39 >0.5 μm, 12 |
| Control 7 | 2-(12) | $Y_2O_3$-$ZrO_2$ irregular | 0.34 | 39 | X | no | X | X | >0.3 μm, 46 >0.5 μm, 15 |
| Control 8 | 2-(13) | $Y_2O_3$-$ZrO_2$ irregular | 0.30 | 32 | X | no | X | X | >0.3 μm, 38 >0.5 μm, 11 |

TABLE 4-continued

| No. | No. of Referential Example of slurry used | Name of powder and shape of fine particle | Average particle size (10⁻⁶m) | Variation coefficient of particle size (%) | MEK | toluene | MMA | water | Distribution of particle size (wt %) |
|---|---|---|---|---|---|---|---|---|---|
| Example 10 | 2-(15) | silica sphere | 0.63 | 12 | ○ | no | ○ | ○ | >1.0 μm, 10 >3.0 μm, 3 |
| Example 11 | 2-(16) | silica sphere | 10.4 | 8 | ⊙ | no | ○ | ⊙ | >13 μm, 6 >15 μm, 1 |
| Example 12 | 2-(17) | silica sphere | 10.2 | 7 | ⊙ | no | ⊙ | ⊙ | >13 μm, 5 >15 μm, 1 |
| Example 13 | 2-(18) | silica sphere | 10.2 | 7 | ⊙ | no | ⊙ | ⊙ | >13 μm, 5 >15 μm, 1 |
| Example 14 | 2-(19) | alumina sphere | 0.12 | 16 | ⊙ | ○ | ⊙ | no* | >0.3 μm, 17 >0.5 μm, 2 |
| Example 15 | 2-(20) | zirconia sphere | 0.62 | 4 | ⊙ | ⊙ | ⊙ | no* | >1.0 μm, 6 >3.0 μm, 0 |
| Example 16 | 2-(21) | titania sphere | 0.43 | 6 | ⊙ | ○ | ⊙ | no* | >1.0 μm, 4 >2.0 μm, 1 |
| Example 17 | 2-(22) | polymethyl silseski oxane sphere | 2.1 | 9 | ⊙ | ○ | ⊙ | no* | >5.0 μm, 4 >8.0 μm, 0 |
| Example 18 | 2-(23) | Y₂O₃-ZrO₂ irregular | 0.16 | 18 | ⊙ | ⊙ | ⊙ | no* | >0.3 μm, 22 >0.5 μm, 4 |
| Example 19 | 2-(24) | silica sphere | 10.2 | 7 | ⊙ | no | ⊙ | ⊙ | >13 μm, 5 >15 μm, 1 |
| Control 9 | 2-(17) | silica sphere | 11.4 | 9 | X | no | X | X | >13 μm, 10 >15 μm, 3 |
| Control 10 | 2-(18) | silica sphere | 11.7 | 10 | X | no | X | X | >13 μm, 12 >15 μm, 5 | no: not dispersed
*: hydrophobic

TABLE 5

| No. | Compound (D) bond to fine particle surface of powder Name | Amount of bond (m mol/g) | Amount of compound (D) to the amount of fine particle in raw slurry (wt ratio) |
|---|---|---|---|
| Example 7 | n-propanol | 2.1 | 3.7 |
| Example 8 | methanol | 0.2 | 2.8 |
| Control 6 | n-propanol | 0.1 | 3.7 |
| Example 10 | methanol | 0.2 | 1.3 |
| Example 11 | methanol | 1.2 | 5.9 |
| Example 12 | methanol | 1.0 | 2.7 |
| Example 13 | methanol ethylene glycol | 1.0 2.5 | 2.7 0.3 |
| Example 14 | isopropanol | 1.7 | 7.0 |
| Example 15 | n-propanol n-butanol | 2.3 0.5 | 24.7 2.4 |
| Example 16 | methanol isopropanol | 0.3 0.8 | 10.3 0.6 |
| Example 18 | methanol phenyl trimethoxy silane | 0.2 | 2.8 0.03 |
| Example 19 | methanol 3-aminopropyl triethoxy silane | 1.0 | 2.7 0.05 |
| Control 9 | methanol | 0 | 2.7 |
| Control 10 | methanol ethylene glycol | 0 0.2 | 2.7 0.3 |

TABLE 6

| No. | Name of powder and shape of fine particle | Calcination temperature (°C.) | Average particle size:d(10⁻⁶m) | Specific surface area:S(m²/g) | Density:p (g/m³) | S × d × p | Variation coefficient of particle size (%) |
|---|---|---|---|---|---|---|---|
| Example 20 | silica sphere | 400 | 10.2 | 1.8 | 1.95 × 10⁶ | 35.8 | 8 |
| Example 21 | silica sphere | 600 | 10.1 | 15.1 | 2.00 × 10⁶ | 305 | 7 |
| Example 22 | alumina sphere | 500 | 0.11 | 17.2 | 3.05 × 10⁶ | 57.7 | 18 |
| Example 23 | zirconia sphere | 500 | 0.60 | 86.4 | 5.28 × 10⁶ | 274 | 4 |
| Example 24 | titania sphere | 500 | 0.42 | 10.2 | 3.62 × 10⁶ | 155 | 6 |
| Control 11 | silica sphere | 600 | 11.4 | 0.6 | 2.00 × 10⁶ | 13.7 | 15 |

What is claimed is:

1. A method for the production of powder of fine metal oxide particles excellent in dispersibility in various solvents comprising hydrolyzing and condensing a hydrolyzable and condensable organic metal compound in an organic solvent in the presence of water to form an aqueous slurry X of fine particles of a metal oxide, preparing a slurry Y comprising said fine particles of a metal oxide and aqueous solvent from said hydrolyzed slurry X; an organic compound (D) capable of reacting with the surfaces of said fine particles and possessing at least one hydroxyl group in the molecular unit, the amount of said organic compound being not less than 0.01 part by weight based on 1 part by weight of said fine particles; and at least one organic constituent selected from the group consisting of (A) methanol, said methanol being present in an amount not less than 1.0 part by weight based on 1 part by weight of the water present in said aqueous solvent and (B) an organic compound capable of forming a binary azeotropic mixture with water, said azeotropic mixture having a concentration of water (Cw) not less than 4.0% by weight, and solubility of water (Sw) to said compound being an amount of not less than 1.0% by weight at 20° C., the amount of said organic compound being not less than 60% of the amount calculated to form a binary azeotropic mixture with water present in said aqueous solvent, and converting said prepared slurry into powder having an average diameter of 0.1 to 30 μm, a coefficient of particle diameter variation in the range of 2 to 30% and having said compound (D) bound to the surface of said fine particles.

2. A method according to claim 1, wherein said organic compound (B) possesses a boiling point of not more than 120° C. under normal pressure.

3. A method according to claim 1, wherein said organic compound (B) possesses a boiling point of not more than 100° C. under normal pressure.

4. A method according to claim 1, wherein said slurry obtained by hydrolysis and condensation is thermally concentrated to produce a slurry containing said fine particles in concentration in the range of 10 to 40% by weight.

5. A method according to claim 1, wherein said fine particles in said powder possess a spherical shape.

6. A method according to claim 1, wherein said organic metal compound is an alkoxy compound.

7. A method according to claim 6, wherein said alkoxy compound is represented by the general formula I:

 (I)

wherein M is metal element, $R^1$ is at least one group selected from the class consisting of hydrogen atom, substituted or unsubstituted alkyl groups up to 10 carbon atoms, aryl group, and unsaturated aliphatic residues, $R^2$ is an alkyl group, m is 0 or a positive integer, n is an integer of not less than 1, m+n satisfies the valency of said metallic element M, m $R^1$ may be different from one another, and n $R^2$ may be similarly different from one another.

8. A method according to claim 7, wherein said metal element is at least one member selected from the group consisting of silicon, titanium, zirconium, and aluminum.

9. A method according to claim 1, wherein said fine metal oxide particles have as a main component thereof at least one member selected from the group consisting of silicon, titanium, zirconium, and aluminum.

10. A method according to claim 1, wherein the water content in said slurry as raw material is in the range of 3 to 30% by weight.

11. A method for the production of a powder of fine porous metal oxide particles possessing a spherical shape, an average particle diameter in the range of 0.1 to 30 μm, and a coefficient of particle diameter variation in the range of 2 to 30%, satisfying the relation represented by the general formula (II):

$$S \times d \times p > 30 \qquad (II)$$

wherein S is the specific surface area (m²/g) of said powder of fine particles determined by the BET method, d is the number average particle diameter (m) determined by observation under an electron microscope, and p is the density (g/m²) of said powder of fine particles, and conferring satisfactory dispersibility upon said powder, which method comprises preparing a powder by the method of claim 1 further comprising calcining said powder at a temperature exceeding the temperature at which said bound organic compound is decomposed.

12. A method according to claim 11, wherein said organic compound possesses at least two carbon atoms.

13. A method according to claim 11, wherein the calcination temperature is in the range of 300° to 800° C.

14. A method according to claim 1, wherein said slurry obtained by hydrolysis and condensation is thermally concentrated to produce a slurry containing said fine particles in a concentration in the range of 10 to 40% by weight.

15. A method according to claim 1, wherein said fine particles in said powder possess a spherical shape, an average particle diameter in the range of 0.1 to 30 μm, and a coefficient of particle diameter variation in the range of 2 to 30%.

16. A method according to claim 1, wherein said organic metal compound is an alkoxy compound.

17. A method according to claim 16, wherein said alkoxy compound is represented by the general formula I:

 (I)

wherein M is metal element, $R^1$ is at least one group selected from the class consisting of hydrogen atom, substituted or unsubstituted alkyl groups up to 10 carbon atoms, aryl group, and unsaturated aliphatic residues, $R^2$ is an alkyl group, m is 0 or a positive integer, n is an integer of not less than 1, m+n satisfies the valency of said metallic element M, m $R^1$ may be different from one another, and n $R^2$ may be similarly different from one another.

18. A method according to claim 17, wherein said metal element is at least one member selected from the group consisting of silicon, titanium, zirconium and aluminum.

19. A method according to claim 11, wherein said fine metal oxide particles have as a main component thereof at least one member selected from the group consisting of silicon, titanium, zirconium, and aluminum.

20. A method according to claim 11, wherein the water content in said slurry as raw material is in the range of 3 to 30% by weight.

21. A method according to claim 1, wherein said organic solvent contains at least one member selected from the group consisting of methanol, ethanol, n- propanol, isopropanol, n-butanol, sec-butanol, isobutanol, tert-butanol, methylethyl ketone, tetrahydrofuran, dioxane, ethylene glycol, propylene glycol, 2-methoxy ethanol, 2-ethoxy ethanol and 2-butoxy ethanol.

22. The method for the production of powder of fine metal oxide particulates excellent in dispersitity as described in claim 1, wherein said prepared slurry is converted into said powder by the use of a powderization apparatus comprising (1) an externally heatable pipe, one end of which serves as a slurry inlet and the other end of which serves as a device for separating the produced powder and a vapor held in a vacuum state, and (2) a powder collecting chamber connected to said separating device.

* * * * *